(12) United States Patent
Chambers

(10) Patent No.: US 7,163,213 B2
(45) Date of Patent: Jan. 16, 2007

(54) POWERED HAND TRUCK

(75) Inventor: Steven J. Chambers, Los Angeles, CA (US)

(73) Assignee: IndustryAssist, Los Angeles, CA (US), a partnership composed of Steven F. Chambers and Jason F. Potts ( * ) Notice: Subject to any disclaimer, the term of this patent is extended or adjusted under 35 U.S.C. 154(b) by 101 days.

(21) Appl. No.: 10/761,089

(22) Filed: Jan. 20, 2004

(65) Prior Publication Data

US 2005/0155799 A1 Jul. 21, 2005

(51) Int. Cl.
*B62B 1/00* (2006.01)
*B62D 61/12* (2006.01)

(52) U.S. Cl. .................. 280/47.131; 180/209; 414/490

(58) Field of Classification Search ................. 180/11, 180/16, 19.1, 19.3, 209, 216, 907, 908, 65.1, 180/65.5, 65.6; 280/47.27, 47.131, 47.34, 280/47.35; 414/444, 490
See application file for complete search history.

(56) References Cited

U.S. PATENT DOCUMENTS

| | | | |
|---|---|---|---|
| 1,292,022 A | | 1/1919 | Newman et al. |
| 2,740,484 A | * | 4/1956 | Montana .................... 180/9.22 |
| 2,996,133 A | | 8/1961 | La Warre et al. |
| 3,182,835 A | * | 5/1965 | Meyer et al. ................ 414/456 |
| 3,362,496 A | * | 1/1968 | Landry ....................... 180/9.22 |
| 3,450,219 A | * | 6/1969 | Fleming ....................... 180/8.2 |
| 3,499,501 A | | 3/1970 | Fitzgerald et al. |
| 3,698,501 A | * | 10/1972 | Gross ........................... 180/8.2 |
| 3,719,247 A | * | 3/1973 | Hollis ........................ 180/19.3 |
| 3,856,104 A | * | 12/1974 | Ohba .......................... 180/167 |
| 3,896,893 A | | 7/1975 | Willis et al. |
| 3,997,182 A | | 12/1976 | Mortenson ............... 280/47.27 |
| 4,033,421 A | * | 7/1977 | Ikarimoto .................... 180/8.2 |
| 4,033,595 A | * | 7/1977 | Mauch ....................... 280/5.22 |
| 4,136,888 A | * | 1/1979 | Bowie et al. .............. 280/5.22 |
| 4,312,417 A | * | 1/1982 | Dalton et al. ................. 180/8.2 |
| 4,420,166 A | | 12/1983 | Law et al. .................. 280/5.24 |
| 4,550,924 A | * | 11/1985 | Alber ......................... 280/5.28 |
| 4,570,732 A | * | 2/1986 | Craven ....................... 180/19.3 |
| 4,762,193 A | * | 8/1988 | Levine ....................... 180/65.1 |
| 4,865,340 A | | 9/1989 | Mortenson ............... 270/47.27 |
| 4,960,179 A | * | 10/1990 | Leach ......................... 180/8.2 |
| 4,974,693 A | | 12/1990 | Nakai et al. |
| 5,036,929 A | * | 8/1991 | Trougouboff ............... 180/8.2 |
| 5,137,103 A | * | 8/1992 | Cartmell ..................... 180/167 |
| 5,167,389 A | * | 12/1992 | Reimers ....................... 248/96 |

(Continued)

FOREIGN PATENT DOCUMENTS

JP 09295578 A * 11/1997

*Primary Examiner*—Lesley D. Morris
*Assistant Examiner*—Daniel Yeagley
(74) *Attorney, Agent, or Firm*—Kenneth L. Green; Edgar W. Averill, Jr.

(57) ABSTRACT

A powered hand truck for assisting in the movement of objects. The powered hand truck includes an electric motor, a power source, a programable motor controller, and a transaxle, which are adaptable to existing hand trucks, or may be integrated into a new powered hand truck. The transaxle includes a differential allowing easy maneuvering of the hand truck. Power is provided by replaceable/rechargeable batteries. The motor controller controls the motor to provide consistent speed independent of load weight or incline, and further provides regenerative braking. The motor controller also includes diagnostics communicated through a display mounted to the hand truck.

19 Claims, 9 Drawing Sheets

U.S. PATENT DOCUMENTS

| | | | |
|---|---|---|---|
| 5,207,439 A | 5/1993 | Mortenson | 280/47.2 |
| 5,322,306 A | 6/1994 | Coleman | |
| 5,393,081 A | 2/1995 | Mortenson | 280/47.27 |
| 5,577,568 A | 11/1996 | Scott | 180/19.1 |
| 5,746,282 A | 5/1998 | Fujiwara et al. | |
| 5,799,959 A | 9/1998 | Krawczyk | 280/47.27 |
| 6,039,332 A * | 3/2000 | Austin | 280/47.17 |
| 6,062,328 A | 5/2000 | Campbell et al. | 180/65 |
| 6,098,732 A | 8/2000 | Romick et al. | |
| 6,173,799 B1 * | 1/2001 | Miyazaki et al. | 180/19.3 |
| 6,210,095 B1 | 4/2001 | Hempel et al. | |
| 6,234,497 B1 * | 5/2001 | Stahler, Sr. | 280/47.29 |
| 6,257,358 B1 * | 7/2001 | Roach | 180/19.1 |
| 6,276,471 B1 * | 8/2001 | Kratzenberg et al. | 180/19.3 |
| 6,302,414 B1 | 10/2001 | Berthiaume et al. | 280/47.18 |
| 6,328,319 B1 * | 12/2001 | Stahler, Sr. | 280/47.18 |
| 6,474,427 B1 | 11/2002 | Tunnecliff | |
| 6,488,304 B1 | 12/2002 | Krawczyk | 280/408 |
| 6,530,740 B1 * | 3/2003 | Kim | 414/490 |
| 6,588,775 B1 * | 7/2003 | Malone, Jr. | 280/47.18 |
| 6,601,859 B1 | 8/2003 | Durham | 280/47.131 |
| 6,793,236 B1 * | 9/2004 | Mitchell | 280/652 |
| 2004/0238241 A1 * | 12/2004 | Mitchell, Jr. | 180/19.3 |

\* cited by examiner

POWERED HAND TRUCK

BACKGROUND OF THE INVENTION

The present invention relates to a powered carrier, and more particularly to a powered hand truck.

Hand trucks (or dollies) are well known and commonly used both residentially and commercially to move objects from place to place. Many improvements have been made over recent years to improve hand trucks, and current models provide quality and convenience. A basic example of known hand trucks is shown in side view in FIG. 1A, and in front view in FIG. 1B. Such hand truck finds many residential and commercial uses.

However, due to the geometry of basic hand trucks, they are limited to carrying objects of limited dimensions. Convertible hand trucks having four wheels have been developed which are able to carry object too bulky for two wheel hand trucks. An example of a convertible hand truck is shown in side view in FIG. 2A, and in front view in FIG. 2B, and is further shown in FIG. 3 converted from a hand truck to a platform.

Because of the high quality built into many hand trucks, they may be used to move very heavy objects. While these qualities have expanded the utility of hand trucks, the ability to carry heavy objects has also created greater weights for users to deal with. Such heavy weight has created a need for some form of power assistance for hand truck users. However, in order to retain the utility of the hand truck, the powered hand truck must have weight and dimensions similar to the prior art hand truck. Additionally, the powered hand truck must be controllable in a safe manner, and must allow manual use of the powered hand truck in the event that the power unit fails. Because there are many prior art hand trucks in use, there is a further need to easily convert manual hand trucks to powered hand trucks.

BRIEF SUMMARY OF THE INVENTION

The present invention addresses the above and other needs by providing a powered hand truck for assisting in the movement of objects. The powered hand truck includes an electric motor, a power source, a programable motor controller, and a transaxle, which are adaptable to existing hand trucks, or may be integrated into a new powered hand truck. The transaxle includes a differential allowing easy maneuvering of the hand truck. Power is provided by replaceable/rechargeable batteries. The motor controller controls the motor to provide controlled speed independent of load weight or incline, and further provides regenerative braking. The motor controller also includes diagnostics communicated through a display mounted to the hand truck. The powered hand truck may include a built-in universal recharger, or include a receptacle for an external recharger.

In accordance with one aspect of the invention, there is provided a powered hand truck. The powered hand truck comprises a hand truck frame defining an outer frame width between approximately ten inches and approximately eighteen inches, and a powering assembly comprising an electric motor, a transaxle driven by the electric motor and having differentially connected right and left axles, right and left wheels attached to the right and left axles respectively, a motor controller electrically connected to the motor, and a power source electrically connected to the motor controller. The powering assembly (i.e., the motor, batteries, motor controller, and the transaxle excluding end portions fit within the outer frame width) is adapted to fit substantially within the outer frame width.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1A:
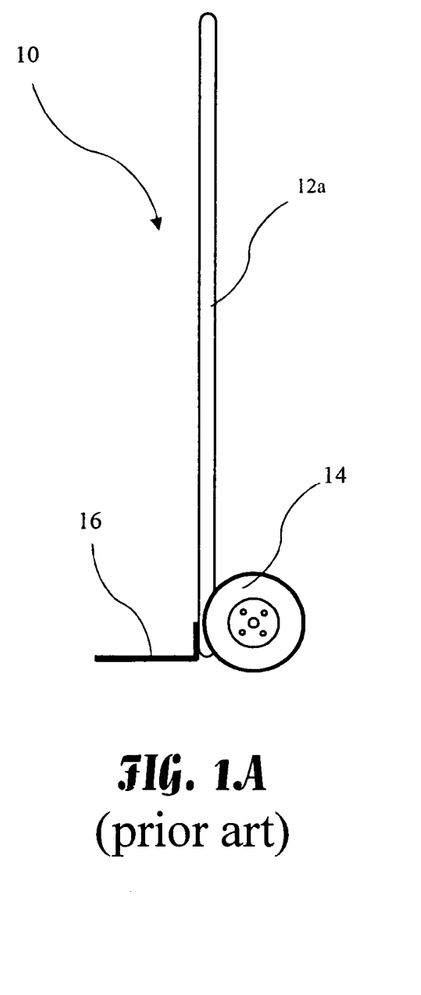
FIG. 1A is a side view of a prior art hand truck.
Figure 1B:
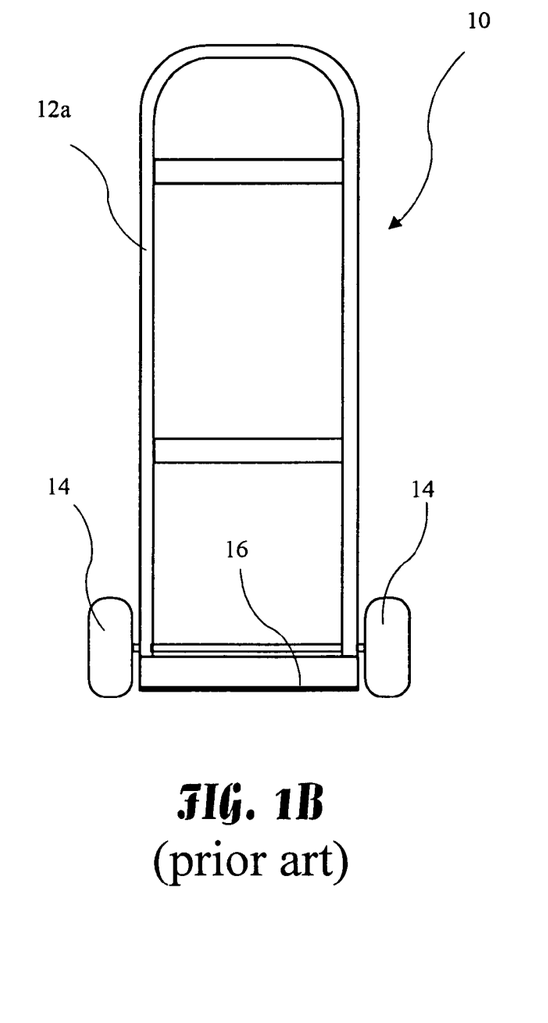
FIG. 1B is a front view of the prior art hand truck.

An example of a prior art hand truck 10 is shown in side view in FIG. 1A, and in front view in FIG. 1B. Such hand truck comprises a first frame 12a, hand truck wheels 14, and a nose 16. Such hand truck 10 is useful for moving objects which may be balanced on the nose 16. An example of a prior art convertible hand truck 20 is shown in side view in FIG. 2A, and in front view in FIG. 2B, and is further shown in FIG. 3 converted from a hand truck to a platform. The convertible hand truck 20 comprises a second frame 12b, the hand truck wheels 16, the nose 16, and additionally, caster wheels 22 supported by convertible frame 24, handles 26 mounted on the convertible frame 24, a latching member 28 attached to the convertible frame 24 proximal to the caster wheels 22, pivot/slide member 30 slidably cooperating with the convertible frame 24, and a latch receiving member 32 attached to the frame 12b and adapted to cooperate with the latching member 28.

Figures 2A, 2B, 3:
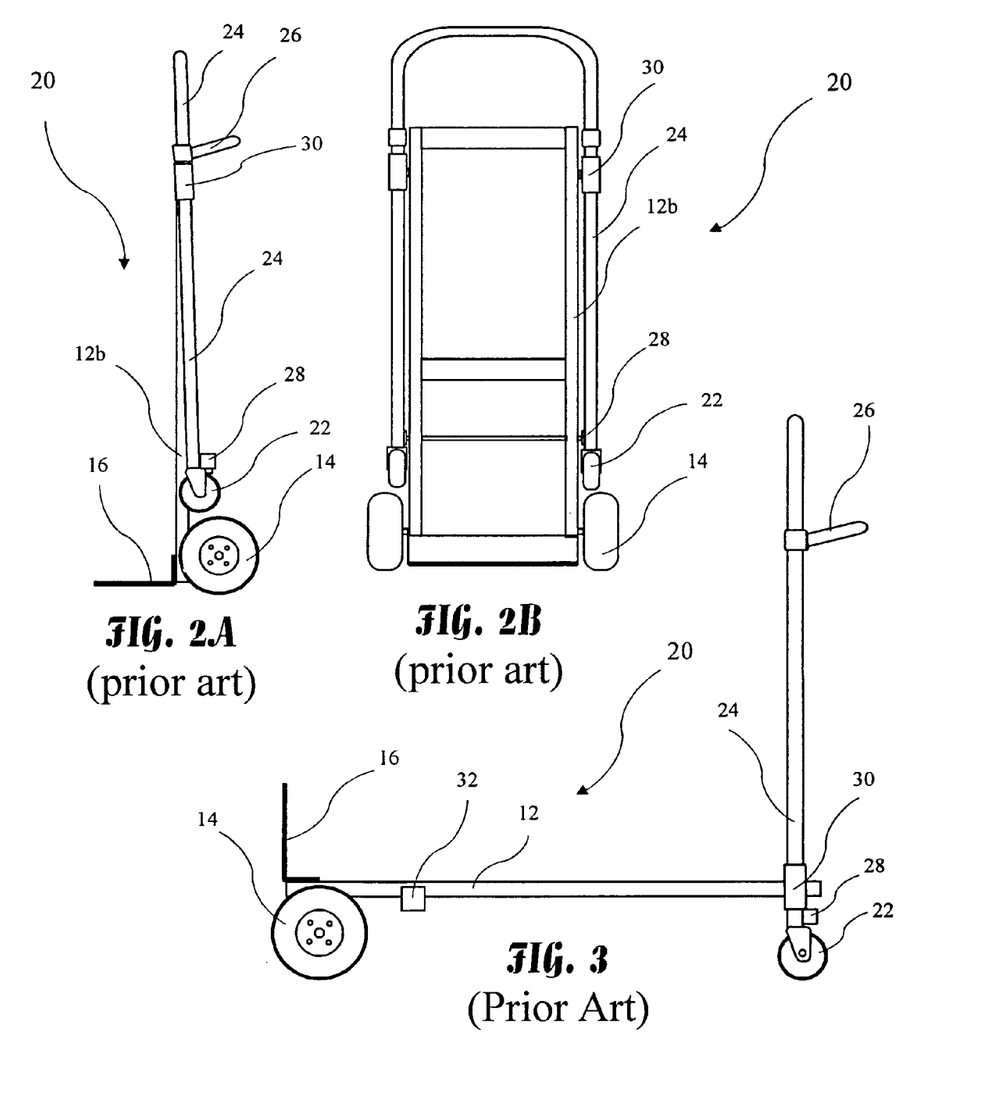
FIG. 2A is a side view of a prior art convertible hand truck.
FIG. 2B is a front view of the prior art convertible hand truck.
FIG. 3 is a side view of the prior art convertible hand truck in a platform (i.e., four wheel) mode.

The convertible hand truck 20 may be configured as a standard hand truck as seen in FIGS. 2A and 2B by substantially aligning the convertible frame 24 with the second frame 12b and latching the latching member 28 with the latch receiving member 32. The convertible hand truck 20 may be converted to a four-wheel hand truck (or platform mode) by unlatching the latching member 28 from the latch receiving member 32, rotating the convertible frame 24 at the pivot/slide member 30 to be substantially perpendicular to the second frame 12b, and sliding the convertible frame in the pivot/slide member 30, as seen in FIG. 3. Examples of such convertible hand trucks are the Gemini® Jr. (model number HTGK 1834) and Gemini® Sr. (model number HTGK 9584) manufactured by Magline® Inc. in Pinconning Mich., and are described in Magline® Form No. B7996 Revised August, 2002. Magline® Form No. B7996 is herein incorporated by reference. In the platform mode (i.e., FIG. 3), the Gemini® Jr. and Gemini® Sr. are specified as capable of carrying 1,000 pounds, and have an overall widths of approximately twenty one inches and outer frame widths of approximately twelve inches. Hand truck width is an important design parameter to provide stability and maneuverability and to allow the hand truck to fit on existing truck ramps.

The present invention is a kit for powering hand trucks, and for powering convertible hand trucks in particular. The kit may be adapted to new hand trucks, used hand trucks, or may be incorporated into the initial manufacturing of hand trucks. The kit is particularly suitable for conversion of the Gemini® Jr. and Gemini® Sr. and similar hand trucks, for example, hand trucks manufactured by Harper Hand Trucks in Wichita, Kans. and by Cascade Equipment, to powered hand trucks, for assisting in the movement of objects.

Figures 4A, 4B, 5:
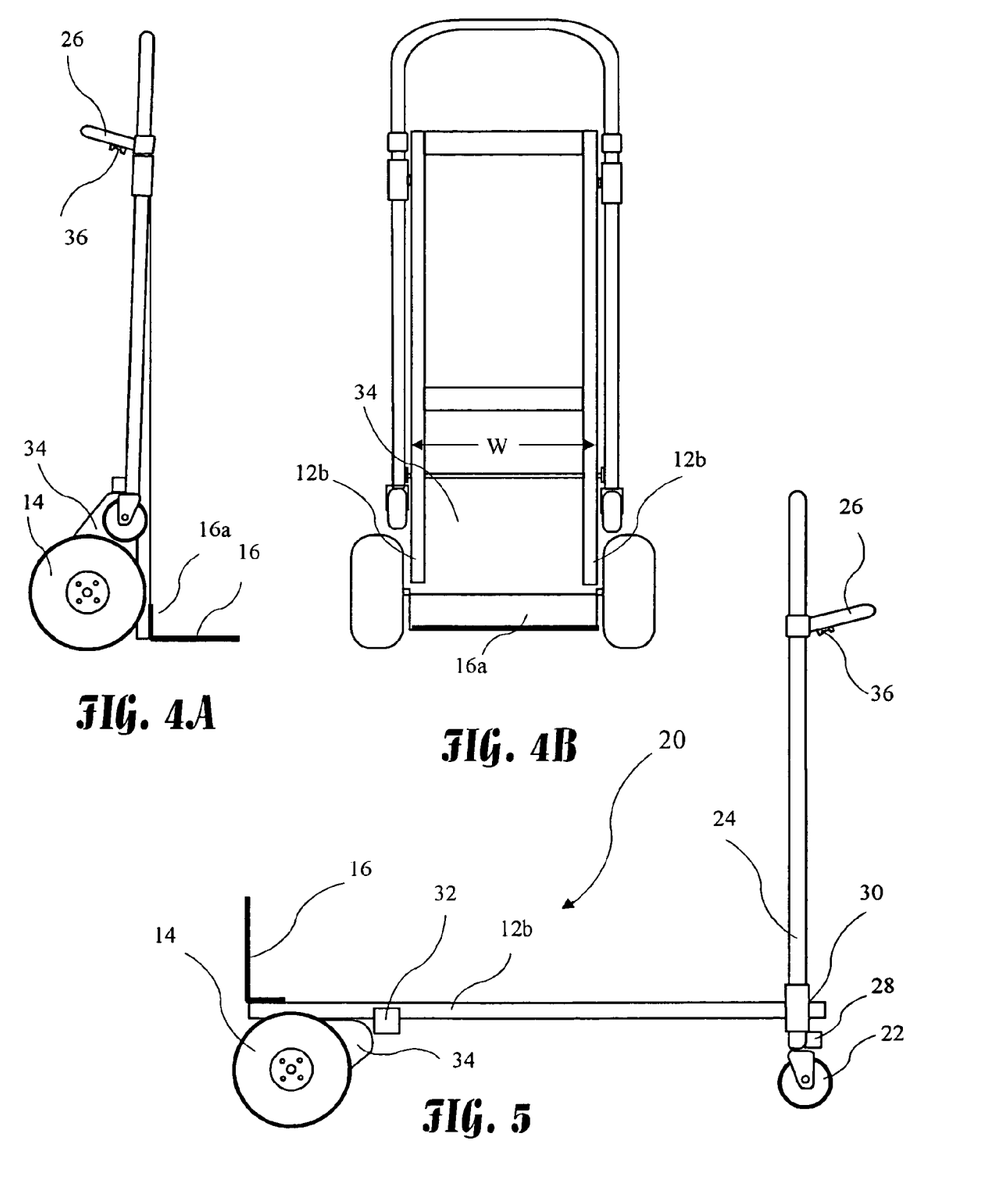
FIG. 4A is a side view of a power hand truck according to the present invention.
FIG. 4B is a front view of a power hand truck according to the present invention.
FIG. 5 is a side view of the power hand truck according to the present invention in a platform mode.

An example of a powered convertible hand truck is shown in FIG. 4A in side view, and in FIG. 4B in front view. A powering assembly 34 resides proximal to the hand truck wheels 14, and behind rear portion 16a of the nose 16, and fits substantially within the outer width W of the frame 12b, which outer width W is preferably between approximately ten inches to approximately eighteen inches, and is more preferably between approximately ten inches to approximately fourteen inches, and most preferably approximately twelve inches. The powering assembly 34 defines a rounded profile which tapers toward the hand truck handles 26. Such tapering aids in sliding the hand truck over obstacles, for example curbs, and provides protection for the internal components of the powering assembly 34. The frames 12b and 24 are preferably fabricated from aluminum or magnesium, and more preferably from aluminum, and the frame 12b may be characterized as a ladder-like frame.

Figure 6A:
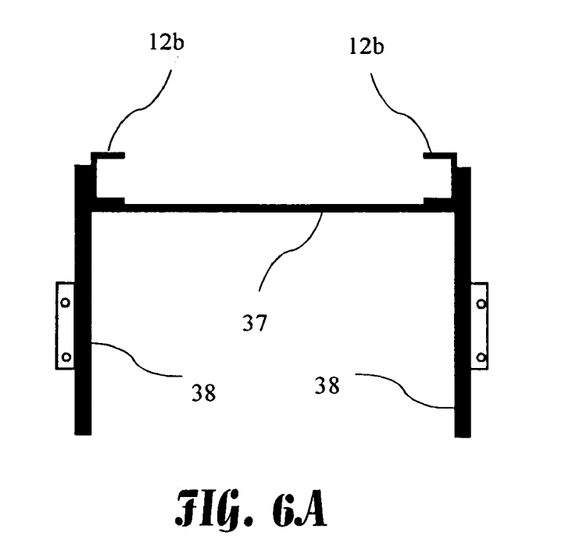
FIG. 6A is a top view of side plates and a back plate of the present invention attached to a hand truck frame.
Figure 6B:
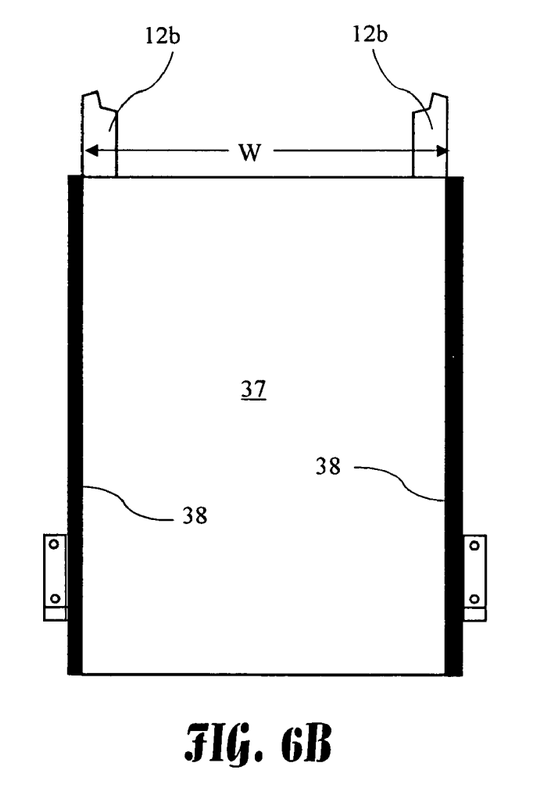
FIG. 6B is a rear view (with respect to the hand truck) of the side plates and the back plate of the present invention attached to the hand truck frame.
Figure 6C:
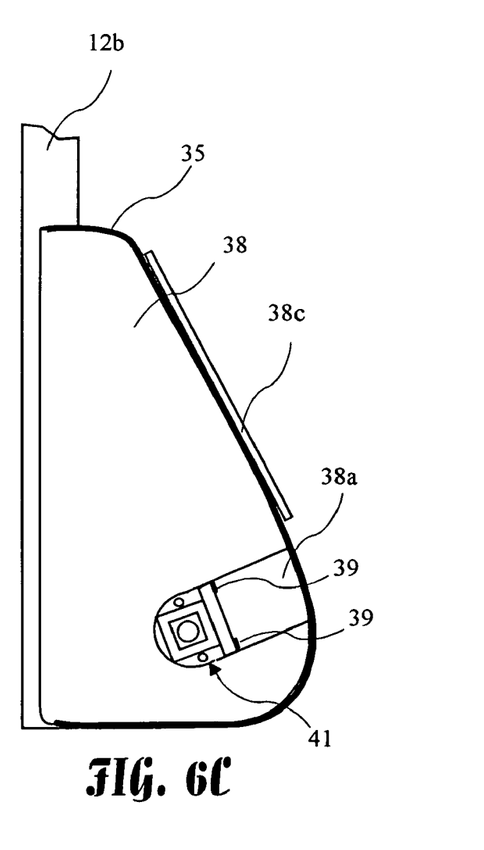
FIG. 6C is a side view (with respect to the hand truck) of the side plates and the back plate of the present invention attached to the hand truck frame.

The powering assembly 34 is attached to the side plates 38 and back plate 37. A top view of the side plates 38 and back plate 37 is shown in FIG. 6A. The side plates 38 and back plate 37 are attached to the second frame 12b. A rear view (with respect to the hand truck) of the side plates 38 and back plate 37 is shown in FIG. 6B, and a side view of one of the side plates 38 and back plate 37 is shown in FIG. 6C. An assembly cover 35 is shown in edge view in FIG. 6C and covers the rear and bottom of the powering assembly 34. The assembly cover 35 attaches to both side plates 38. Side plate skids 38c are attached to each side plate 38, through the assembly cover 35, to assist in sliding the hand truck over obstacles, for example, over curbs. The side plate skids 38c are preferably fabricated from polytetrafluoroethene (PTFE), but may be made from any material with similar characteristics.

Figure 7A:
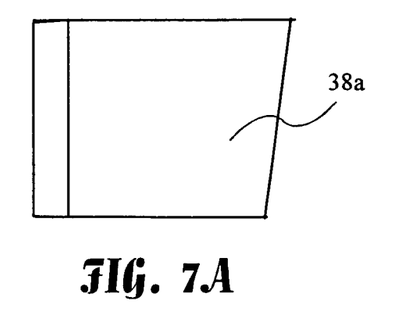
FIG. 7A is a side view of a side plate insert utilized to secure a transaxle to the side plate according to the present invention.
Figure 7B:
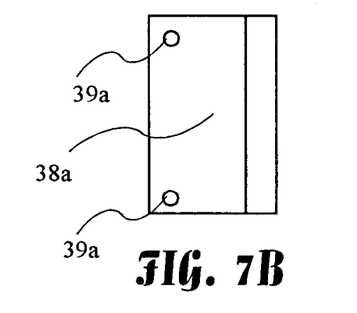
FIG. 7B is a rear view (with respect to the hand truck) of the side plate insert utilized to secure the transaxle to the side plate according to the present invention.
Figure 7C:
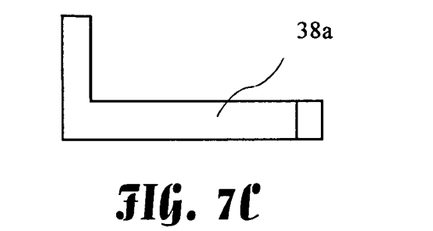
FIG. 7C is an edge view of the side plate insert utilized to secure the transaxle to the side plate according to the present invention.

A side plate insert 38a held in place by side plate insert fasteners 39 is shown in FIG. 6C. The fasteners 39 are preferably screws or bolts. Each side plate insert 38a fits into a cut out section of each side plate 38 and is substantially flush with the side plate 38. The side plate insert 38a cooperates with a transaxle block 41 to retain the transaxle 40 (see FIG. 8) in place. The transaxle 40 may be removed by removing the two side plate inserts 38a (i.e., the transaxle 40 may be remove by removing the four side plate insert bolts 39). Detailed side, rear (with respect to the hand truck) and edge views of the side plate insert 38a are shown in FIGS. 7A, 7B, and 7C respectively. Bolt holes 39a for mounting the side plate insert 38a are apparent in FIG. 7B.

Figure 8:
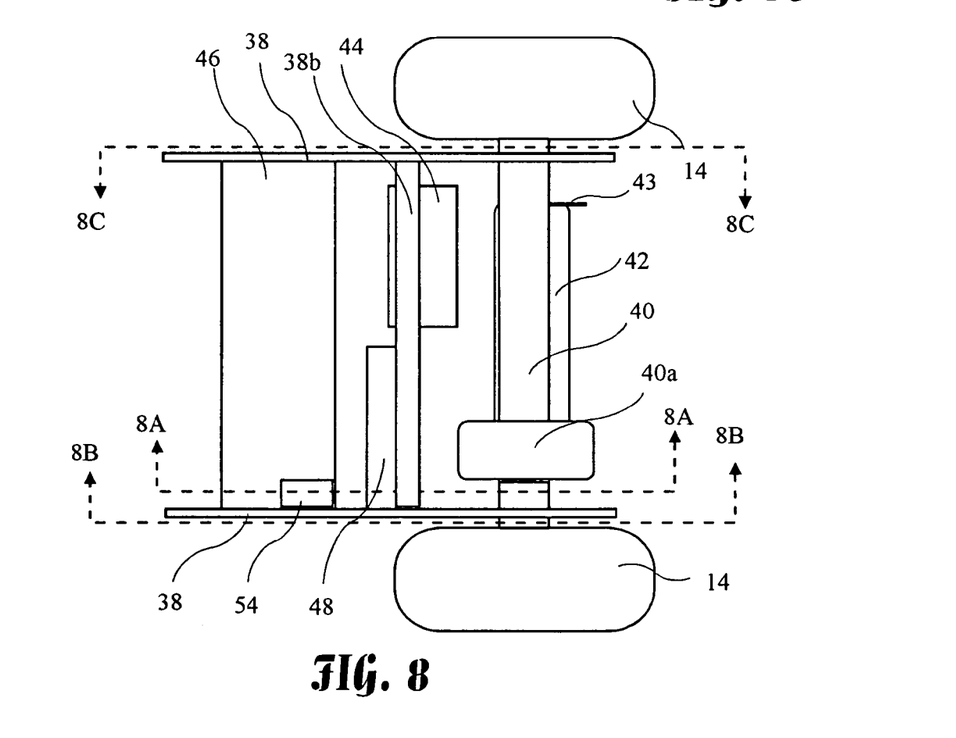
FIG. 8 is a rear view (with respect to the hand truck) of the powering assembly according to the present invention.
Figure 8A:
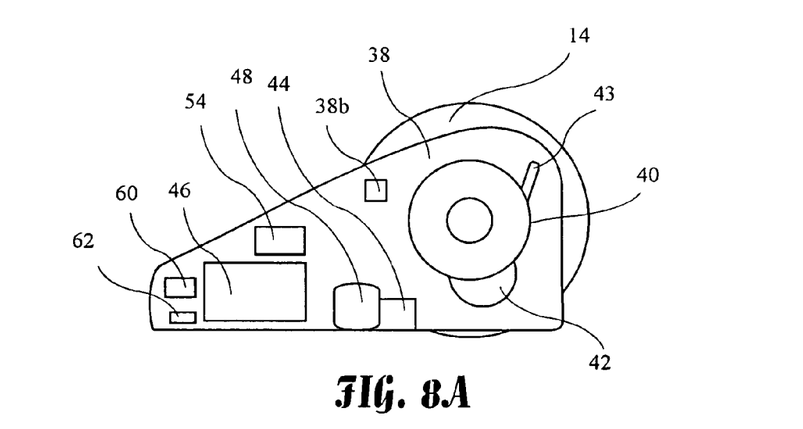
FIG. 8A is a cross-sectional view of the powering assembly taken along line 8A—8A of FIG. 8.
Figures 8B, 8C:
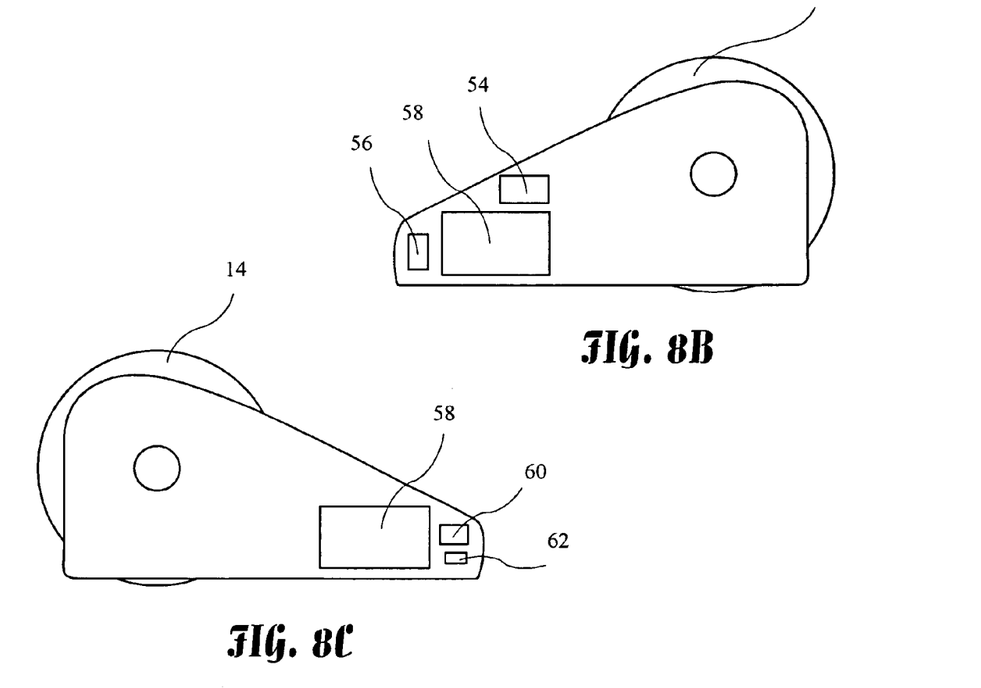
FIG. 8B is a cross-sectional view of the powering assembly taken along line 8B—8B of FIG. 8.
FIG. 8C is a cross-sectional view of the powering assembly taken along line 8C—8C of FIG. 8.

The internal components of the powering assembly 34 are shown in FIG. 8, and in cross-sectional views in FIGS. 8A, 8B, and 8C taken along lines 8A—8A, 8B—8B, and 8C—8C of FIG. 8 respectively. The powering assembly 34 includes as major components an electric motor 42, a power source 46, a programable motor controller 44, a recharger 48, and a transaxle 40. The transaxle 40 includes a differential 40a which differentially connects right and left axles, thereby allowing easy maneuvering (e.g., turning) of the hand truck. The major components reside between side plates 38 and behind back plate 37. An electrical receptacle 54 resides in the left one of the side plates 38. A side plate brace 38b runs between side plates 38.

The transaxle 40 preferably is geared between sixteen to one and twenty five to one, and more preferably twenty one to one. The transaxle 40 is preferably between approximately sixteen inches and twenty three inches wide, and more preferably between approximately nineteen inches and approximately twenty two inches wide, and most preferably approximately 19.3 inches wide (where width is defines as from right axle tip to left axle tip). The transaxle 40 is preferably a limited slip transaxle. A preferred transaxle is reference number S23083, made by Stature Electric in Watertown, N.Y.

The motor 42 preferable between approximately one quarter and approximately one half Horse Power (HP), and more preferably between approximately one quarter and approximately one third HP, and most preferably approximately one quarter HP. The motor 42 is further preferably an approximately twelve volt motor to an approximately thirty six volt motor, and more preferably an approximately twenty four volt motor. The motor 42 diameter is preferably between approximately three inches and approximately five inches, and is more preferably approximately three and one half inches. The motor 42 is oriented relative to the transaxle to provide maximum ground clearance without interfering with other powering assembly 34 components. Preferably motors are manufactured by Stature Electric in Watertown, N.Y., and by Euclid/Imperial Electric in Akron, Ohio. A manual brake is integrated into the motor 42 is activated by a lever 43 extending rearwardly from the right rear of the motor 42.

The motor controller 44 preferably is programable and controls the motor 42 to maintain a desired speed independent of load and/or incline. The motor controller 44 also provides regenerative braking. Programs may be saved by the motor controller 44 and downloaded into the motor controller 44. The motor controller 44 is switchable between low and high speeds, and the low speed and high speed may be programmed, acceleration may be programmed, and braking may be programmed. Active (i.e., using the motor 42) braking is also provided by the motor controller 44, wherein the hand truck speed is limited to a desired speed when the hand truck is descending an incline. The motor controller 44 is preferably an Off The Shelf (OTS) motor controller and is more preferably an i-Drive, made by PG Drives in Dorset, UK.

The power source 46 is preferably twelve volt, twenty four volt, or thirty six volt and preferably replaceable and/or rechargeable batteries, and more preferably two twelve volt batteries in series providing a total of twenty four volts and 7.2 amp-hr, and most preferably are two approximately six pound approximately 2.55 inch wide by approximately 3.75 inch high by approximately 6.00 inch length batteries. The batteries may be lead acid, lithium, nickel metal hydride, or nickel cadmium batteries. Advantageously, using two twelve volt batteries allows recharging from many common sources such as an automotive electrical system. The batteries preferably reside in series behind hinged access doors in a battery compartment, with central springs biasing the batteries outward for easy removal. Power source 46 voltage is displayed by voltage display 56 above the power source door 58 (FIG. 8B), and preferably voltage is displayed at all times. The voltage display 56 preferably has a zero to twenty eight volt range display.

The charger 48 is preferably a twenty four volt universal charger, and preferably a smart charger wherein, for example, the charger 48 charges at full charging rate until ninety percent of full charge is reached, and then the charger 48 switches to a trickle mode. A preferred charger is manufactured by Soniel in Canada.

A controller display 60 and on/off switch 62 reside above a right power source door 58 shown in FIG. 8C. The controller display displays diagnostic information upon turn-on, preferably for three seconds. The display 60 provides information regarding brake and speed controls, and any other faults (i.e., wiring etc.) and is generated by the motor controller 44 software. After the initial display of diagnostic information, the display 60 provides power source 46 level.

Figure 9:
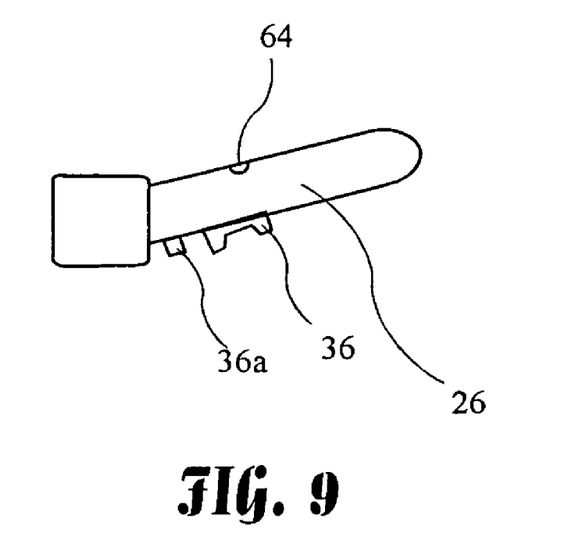
FIG. 9 is a hand truck handle including a speed control according to the present invention.

A detained view of the handle 26 (generally the right handle) is shown in FIG. 9. The speed control 36, the hi/low speed switch 36a, and an indicator 64 reside on the handle 26. The speed control 36 is a finger control (wig-wag) type switch. The switch 36 preferably has as much as approximately ±forty five degrees of motion and more preferably has approximately ±fifteen degrees of motion, and provides both forward and rearward motion. The switch 36 preferably provides a range of forward and reverse speed based on the amount the switch 36 vis moved, and is more preferably a potentiometer, and most preferably a Model No. J3R-1-5K potentiometer made by Sakea Tsushin Kogyo Co., LTD. in Kawasaki-City, Japan. The motor controller 44 automatically determines trim for the control 36 exercising the motor controller software.

The hi/low speed switch 36a selects one of two speeds programmed into the motor controller 44. The low speed is generally suitable for using the hand truck in a two wheel mode, and the high speed is generally suitable for using the hand truck in a four wheel mode. Additionally, an additional high speed lockout may be built into the latch receiving member (see FIG. 5) to prevent high speed operation in the two wheel mode. Preferably, low speed is between approximately one Miles Per Hour (MPH) and approximately three MPH and high speed is between approximately three MPH and approximately five MPH. More preferably, low speed is approximately two MPH and high speed is approximately three and one half MPH. The indicator 64 provides off/on information, and motor controller 44 diagnostic information (in the form of a number of blinks at turn-on). The control 36, switch 36a, and indicator 64, may be hard wired to the motor controller 44, or one or more may communicate wirelessly with the motor controller 44.

Figure 10A:
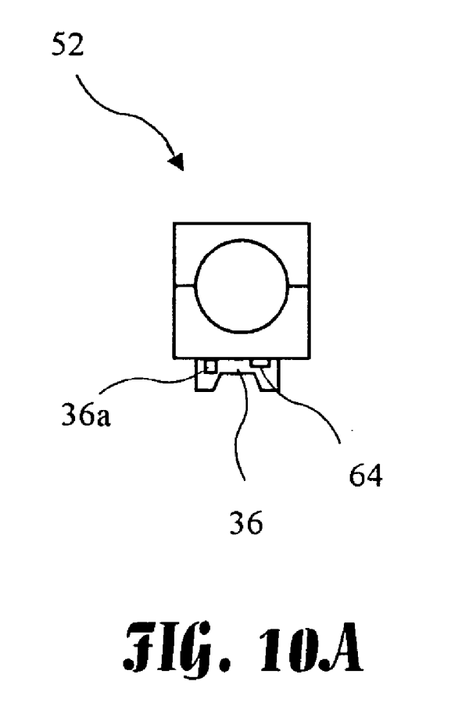
FIG. 10A is an end view of a grip mountable speed control according to the present invention.
Figure 10B:
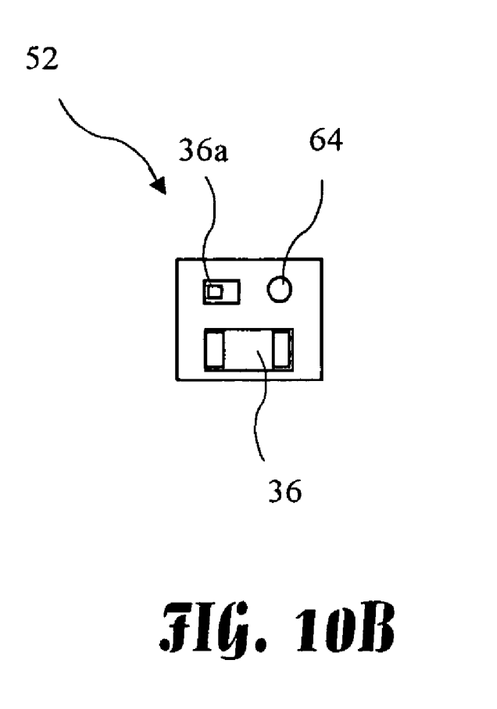
FIG. 10B is a top view of a grip mountable speed control according to the present invention.

The speed control 36, hi/low speed switch 36a, and indicator 64 may also be mounted on a separate grip mount 52 as shown in FIGS. 10A and 10B. Such grip mount 52 may be attached to any substantially round profile frame portion of the hand truck, for example, the convertible frame 24 (see FIG. 4A, 4B, or 5), and may be arbitrarily rotated about a mounting point.

Figure 11A:
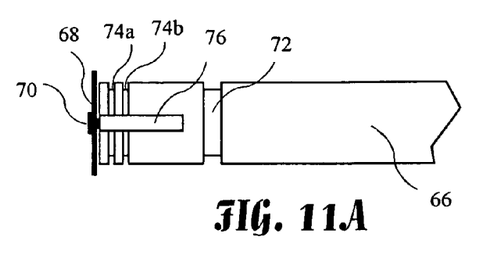
FIG. 11A is a rear view (with respect to the hand truck) of an axle end according to the present invention.
Figure 11B:
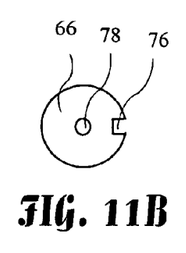
FIG. 11B is an end view of the axle end.
Figure 11C:
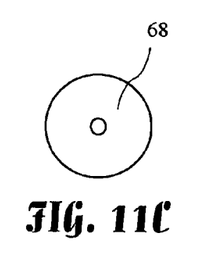
FIG. 11C is an axle end cover according to the present invention.

An axle end 66 is shown in FIG. 11A. The axle end 66 defines a wheel groove 72, a keyway 76, and first and second hub grooves 74a and 74b. An axle end cover 68 is attached to the end of the axle by cover screw 70. An end view of the axle end 66 is shown in FIG. 11B showing the keyway 76, and a threaded hole 78 for attaching the axle end cover 68. A front view of the axle end cover 68 is shown in FIG. 11C.

Figure 12A:
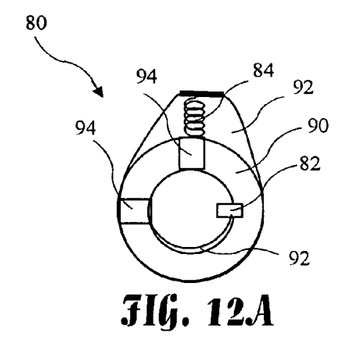
FIG. 12A is a rear view of a hub used to engage and disengage a wheel from the axle end.
Figure 12B:
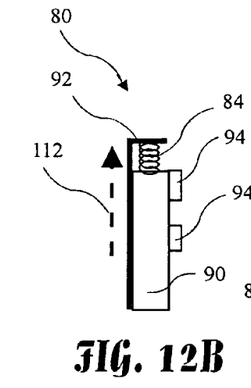
FIG. 12B is a side view of the hub used to engage and disengage a wheel from the axle end.
Figure 12C:
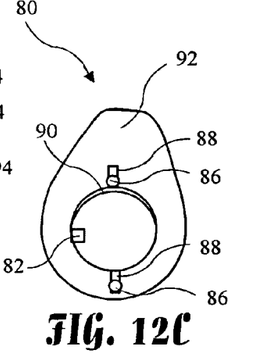
FIG. 12C is a front view of the hub used to engage and disengage a wheel from the axle end.
Figure 13A:
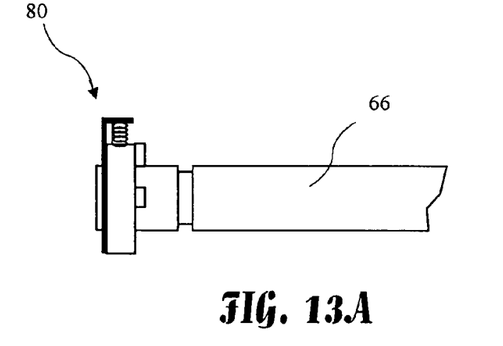
FIG. 13A is a side view of the hub in a first hub position.
Figure 13B:
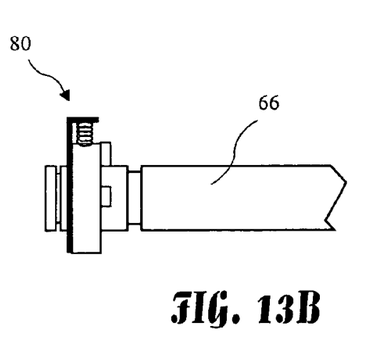
FIG. 13B is a side view of the hub in a second hub position.

A hub 80 for cooperating with the hub grooves 74a and 74b is shown in FIGS. 12A, 12B, and 12C. The hub 80 includes a body 90 suitable for sliding over the axle end 66, and a key 82 which cooperates with the keyway 76 (FIGS. 11A and 11B) to rotationally fix the hub 80 to the axle end 66. A lock 92 is attached to the body 80 by pins 86 in pin slots 88, wherein the lock 92 can slide relative to the body 90. The lock 92 is biased in a first position by a spring 84, indicated by arrow 112. The body 90 further defines at least one lug 94 adapted to cooperate with lug notches 96 (see FIG. 14). The hub 80 may assume a first hub position as shown in FIG. 13A, or a second hub position as shown in FIG. 13B, wherein the lock 92 engages the first hub groove 74a for the first position, and the second hub groove 74b for the second hub position.

Figures 14, 14A, 15:
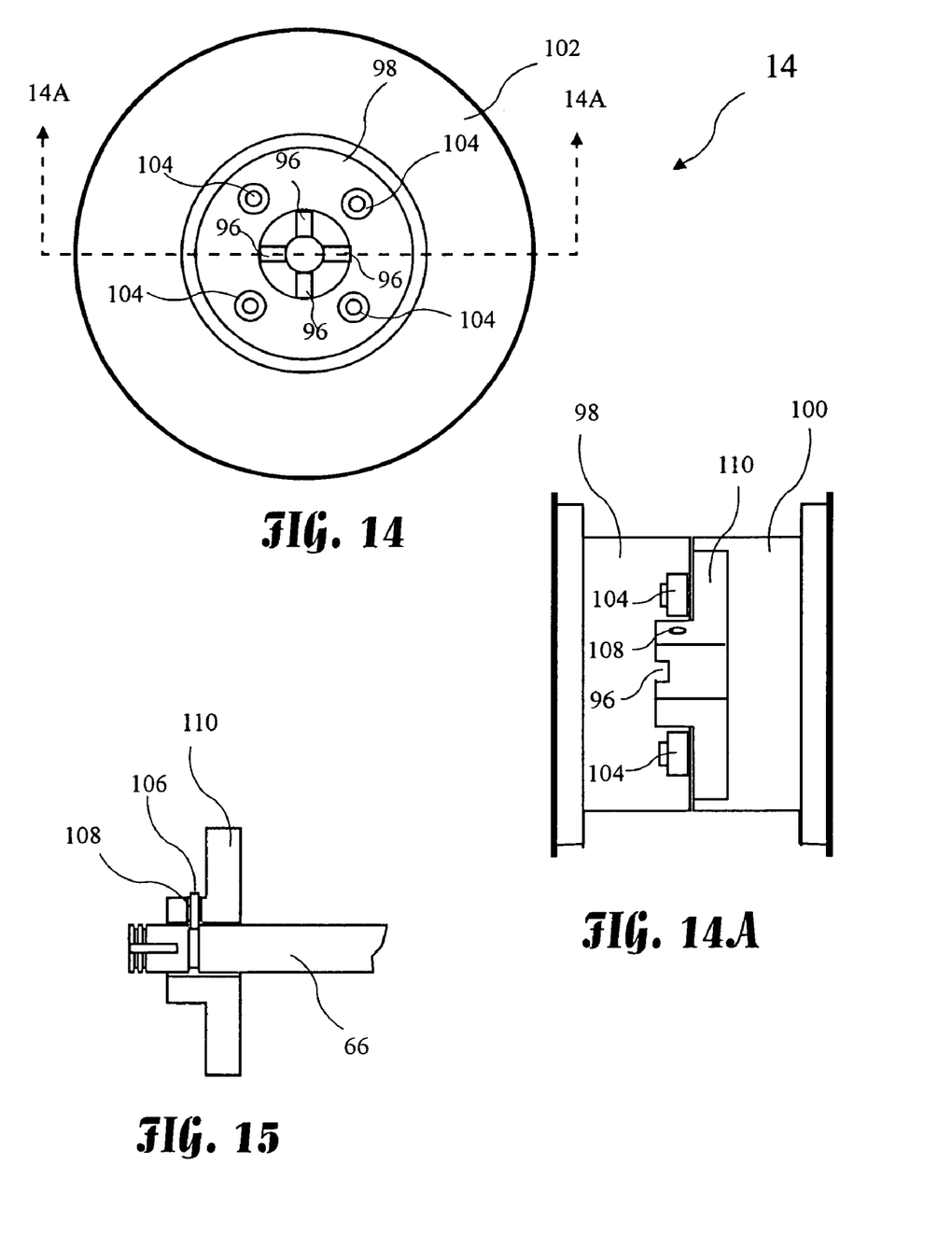
FIG. 14 is a front view of a hand truck wheel suitable for use with the present invention.
FIG. 14A is a cross-sectional view of the hand truck wheel taken along line 14A—14A of FIG. 14.
FIG. 15 is a cross-sectional view of the cooperation of a wheel hub with the axle end.

Details of the wheel 14 are shown in FIG. 14. The wheel 14 is preferably a standard hand truck wheel as is provided with, for example, the Gemini Jr, or the Gemini Sr., and includes a tire 102 (preferably a 10×3.5 pneumatic tire), an outer wheel portion 98, and a wheel hub 110 (see FIGS. 14A and 15) defining lug notches 96 which cooperate with the lugs 94 (see FIG. 12A). A cross-sectional view taken along line 14A—14A of FIG. 14 is shown in FIG. 14A. The outer wheel portion 98 is attached to an inner wheel portion 100 by wheel fasteners 104, and defines at least one fixing pin hole 108.

A cross-sectional view of the cooperation of a wheel hub 110 with the axle end 66, is shown in FIG. 15. The wheel hub 110 is axially fixed to the axle end 66 by at least one fixing pin 106 residing in the fixing pin hole 108, and cooperating with the wheel groove 72. Thus connected, the wheel 14 is fixed axially relative to the axle end 66, but is free to rotate about the axle end 66. When the hub 80 is in the first position (see FIG. 13A) the wheel 14 is free to rotate about the axle 66. When the hub 80 is in the second position (see FIG. 13A) the wheel 14 is rotationally fixed to the axle 66. Thus a true neutral may be obtained by having the hub in the first position.

While the invention herein disclosed has been described by means of specific embodiments and applications thereof, numerous modifications and variations could be made thereto by those skilled in the art without departing from the scope of the invention set forth in the claims.

I claim:

1. A powering assembly for converting a manual hand truck to a motor driven hand truck, the assembly comprising:
    an electric motor;
    a transaxle driven by the electric motor and having differentially connected right and left axles;
    right and left wheels attached to the right and left axles respectively;
    a right locking hub connected between the right axle and the right wheel and a left locking hub connected between the left axle and the left wheel, each locking hub having a first hub position and a second hub position, wherein in the first hub position each locking hub disengages the respective wheel from the respective axle, and in the second hub position each locking hub engages the respective wheel with the respective axle;
    a motor controller electrically connected to the motor;
    a power source electrically connected to the motor controller; and
    said powering assembly fits substantially within an outer frame width of the hand truck.

2. The powering assembly of claim 1, wherein:
    the axles include wheel grooves, and wherein the wheels include fixing pins for engaging the wheel grooves to attach the wheels to the axles so that they are axially fixed with respect to the axles.

3. The powering assembly of claim 1, wherein the outer frame width is between approximately ten inches and approximately eighteen inches.

4. The powering assembly of claim 3, wherein the outer frame width is approximately twelve inches.

5. The powering assembly of claim 1, wherein the power source comprises two twelve volt batteries.

6. The powering assembly of claim 1, wherein the motor is between approximately one quarter and approximately one half horse power.

7. The powering assembly of claim 6, wherein the motor is between approximately one quarter and approximately one third horse power.

8. The powering assembly of claim 7, wherein the motor is approximately one quarter horse power.

9. The powering assembly of claim 8, wherein the transaxle and motor may be removed from the hand truck by releasing four fasteners.

10. The powering assembly of claim 1, wherein at least a portion of the powering assembly resides outside a wheel radius of the wheels, and the powering assembly further including side plates defining a protective profile for the powering assembly.

11. The powering assembly of claim 10, further including slides attached to the side plates to facilitate sliding the hand truck over obstacles.

12. The powering assembly of claim 11, wherein the slides are fabricated from polytetrafluoroethene (PTFE).

13. The powering assembly of claim 1, wherein the hand truck includes handles, and wherein the powering assembly includes a speed control attached to the handles, and a power on/off indicator residing proximal to the speed control.

14. The powering assembly of claim 1, further including a hi/low speed switch for selecting a high speed mode or a low speed mode.

15. The powering assembly of claim 14, wherein the high speed is approximately four miles per hour and the low speed is approximately two miles per hour.

16. The powering assembly of claim 1, wherein the hand truck is a convertible hand truck having a two wheel mode and a platform mode, and a low speed is automatically selected when the hand truck is in the two wheel mode.

17. A powered hand truck comprising:
    a hand truck having a frame defining an outer frame width;
    a handle connected to the frame for guiding the hand truck;
    an electric motor;
    differentially connected right and left axles driven by the electric motor;
    right and left wheels attached to the right and left axles respectively;
    a motor controller electrically connected to the motor;
    a speed control connected to the handle and communicating wirelessly with the motor controller; and
    a power source electrically connected to the motor controller,
    wherein said electric motor resides substantially within the outer frame width.

18. A powered hand truck comprising:
    a frame defining an outer frame width;
    a nose end of said frame for carrying material in a two wheel hand truck mode, wherein the nose end is proximal to a floor surface when the hand truck is used in the two wheel mode;
    a handle end of said frame opposite said nose end;
    an electric motor fixedly attached to said frame proximal to said nose end;
    a right axle and a left axle differentially connected and driven by the electric motor;
    right and left hand truck wheels attached to the right and left axles respectively and residing proximal to said nose end;
    a convertible frame residing parallel to the frame when the hand truck is in the two wheel mode, and configurable to reside substantially perpendicular to the frame and connected to the frame proximal to the handle end of the frame, when the hand truck is in a platform mode;

right and left caster wheels attached to the convertible frame for use in the platform mode;

a power source electrically connected to the electric motor, and a wireless speed control attached to the convertible frame opposite the caster wheels, wherein said motor, and power source reside substantially within the outer frame width.

19. The powering assembly of claim 18, wherein the hand truck wheels are connected to the axles so that the hand truck wheels may be set to rotate freely on the axles and may be fixed to the axles so that the hand truck wheels do not rotate with respect to the axles.

* * * * *